US007796939B2

(12) United States Patent
Kwon

(10) Patent No.: US 7,796,939 B2
(45) Date of Patent: Sep. 14, 2010

(54) DIGITAL MULTIMEDIA BROADCASTING RECEIVER HAVING A LOCATION INFORMATION NOTIFICATION FUNCTION AND METHOD OF THE SAME

(75) Inventor: Seong Geun Kwon, Daegu Metropolitan (KR)

(73) Assignee: Samsung Electronics Co., Ltd (KR)

( * ) Notice: Subject to any disclaimer, the term of this patent is extended or adjusted under 35 U.S.C. 154(b) by 770 days.

(21) Appl. No.: 11/699,221

(22) Filed: Jan. 29, 2007

(65) Prior Publication Data

US 2007/0199027 A1 Aug. 23, 2007

(30) Foreign Application Priority Data

Feb. 17, 2006 (KR) ...................... 10-2006-0015368

(51) Int. Cl.
*H04Q 7/20* (2006.01)

(52) U.S. Cl. .................... 455/3.02; 455/3.01; 455/3.05; 455/3.06; 455/466; 455/414.1; 370/310; 370/315; 725/62; 725/63; 725/64; 725/65; 725/66

(58) Field of Classification Search ....... 455/3.01–3.06, 455/456.1–457, 432.1, 432.2, 422.1, 403, 455/500, 517, 427–429, 466, 414.1–414.4, 455/426.1, 426.2, 7, 24, 11; 370/310, 315; 725/62–72

See application file for complete search history.

(56) References Cited

U.S. PATENT DOCUMENTS

| | | | | |
|---|---|---|---|---|
| 5,732,338 | A | 3/1998 | Schwob | |
| 6,347,216 | B1 * | 2/2002 | Marko et al. | 455/12.1 |
| 2004/0172647 | A1 * | 9/2004 | Godwin | 725/36 |
| 2007/0171891 | A1 * | 7/2007 | Tran | 370/352 |
| 2008/0096582 | A1 * | 4/2008 | Ono et al. | 455/456.2 |

FOREIGN PATENT DOCUMENTS

| | | | |
|---|---|---|---|
| KR | 1020020013153 | | 2/2002 |
| KR | 2002058647 | A * | 7/2002 |
| KR | 1020020078736 | | 10/2002 |
| KR | 1020030036540 | | 5/2003 |
| KR | 1020030045329 | | 6/2003 |
| WO | WO2005011189 | | 2/2005 |

* cited by examiner

*Primary Examiner*—Keith T Ferguson
(74) *Attorney, Agent, or Firm*—The Farrell Law Firm, LLP

(57) ABSTRACT

A digital multimedia broadcasting (DMB) receiver and a method for notifying location information of the receiver is provided. The DMB receiver stores location information of each gap filler matched to a gap filter identification (GFID), and the gap filler relays digital multimedia broadcasting data transmitted from a satellite. The receiver performs receiving digital multimedia broadcasting data from the gap filler, detects the GFID of the gap filler from the received digital multimedia broadcasting data, detects location information of the gap filler by using the GFID and outputs the location information. Therefore, a user in motion may watch DMB without any risk of missing a destination.

19 Claims, 10 Drawing Sheets

FIG. 4A

| SERIAL NUMBER (431A) | ••• | 3 | 4 | 5 | 6 | 7 | 8 | 9 | 10 | ••• |
|---|---|---|---|---|---|---|---|---|---|---|
| STATION NAME (433A) | ••• | STATION A | STATION A | STATION B | STATION B | STATION B | STATION C | STATION C | STATION C | ••• |
| FLAG (435A) | ••• | T | F | T | F | F | F | T | F | ••• |
| GAP FILLER ID (437A) | ••• | 5 | 100 | 120 | 70 | 16 | 30 | 150 | 210 | ••• |

FIG. 4B

| SERIAL NUMBER (431B) | STATION NAME (433B) | GAP FILLER ID (435B) |
|---|---|---|
| ••• | ••• | ••• |
| 3 | STATION A | 5 |
| 4 | VICINITY OF STATION A | 100 |
| 5 | STATION B | 120 |
| 6 | VICINITY OF STATION B | 70 |
| 7 | VICINITY OF STATION B | 16 |
| 8 | VICINITY OF STATION C | 30 |
| 9 | STATION C | 150 |
| 10 | VICINITY OF STATION C | 210 |
| ••• | ••• | ••• |

FIG. 4C

| SERIAL NUMBER [431C] | • • • | 3 | 4 | 5 | 6 | 7 | 8 | 9 | 10 | • • • |
|---|---|---|---|---|---|---|---|---|---|---|
| STATION NAME [433C] | • • • | STATION A | ƀ | STATION B | ƀ | ƀ | ƀ | STATION C | ƀ | • • • |
| GAP FILLER ID [435C] | • • • | 5 | 100 | 120 | 70 | 16 | 30 | 150 | 210 | • • • |

DIGITAL MULTIMEDIA BROADCASTING RECEIVER HAVING A LOCATION INFORMATION NOTIFICATION FUNCTION AND METHOD OF THE SAME

PRIORITY

This application claims the benefit of Korean Patent Application No. 10-2006-0015368 filed on Feb. 17, 2006, the contents of which are incorporated herein by reference.

BACKGROUND OF THE INVENTION

1. Field of the Invention

The present invention relates to a digital multimedia broadcasting (hereinafter DMB) receiver, and more particularly, to a DMB receiver having a location information notification function realized by using identification information of a satellite broadcasting repeater and method thereof.

2. Description of the Related Art

A digital multimedia broadcasting (DMB) is a broadcasting service for modulating a variety of multimedia signals such as voice and image, and providing the modulated results. Particularly, DMB is a broadcasting service that can allow a user in motion to receive a variety of multimedia broadcasting through a portable receiver or a vehicle-installed receiver with a nondirectional antenna.

With the widespread use of the mobile communication terminal and development of a memory that is capable of storing therein large capacity digital multimedia data such as moving pictures and music video clips, a mobile communication terminal for receiving the DMB data is being developed and commercialized.

Accordingly, users in motion may view DMB by using a DMB phone at various times such as while using public transportation.

In this case, users who are viewing a DMB while riding on a subway or a moving bus may miss a destination if the users are distracted by contents of the DMB. Namely, a user in motion may forget his or her present location if the user's attention is focused on the contents of the DMB.

SUMMARY OF THE INVENTION

Accordingly, an object of the present invention is to solve at least the aforementioned problems and disadvantages of the prior art.

The present invention provides a DMB receiver and a method having a location information notification function and method of controlling the same.

The present invention also provides a DMB receiver and a method for performing a location information notification function by using a satellite gap filler identification information and method of controlling the same.

According to the present invention, a digital multimedia broadcasting (DMB) receiver includes a location information storing unit storing location information of each gap filler, which relays digital multimedia broadcasting data transmitted from a satellite, a receiving unit receiving digital multimedia broadcasting data including a gap filler identification (GFID), a sub control unit detecting the GFID from the received digital multimedia broadcasting data, a main control unit receiving the detected GFID from the sub control unit, searching the location information storing unit by using the GFID, and detecting location information corresponding to the detected GFID, and an output unit providing the location information.

The GFID may be matched to specific location information and stored in the location information storing unit, or may be matched to a subway station name and stored in the location information storing unit. The GFID of a receiver located between a first subway station and a second subway station is matched to a name of either the first or the second subway station, and information representing a matched subway station being a nearby subway station is stored in the location information storing unit.

The location information storing unit includes a flag representing whether a subway station name matched to the GFID is a subway station where a corresponding gap filler is located or a subway station located near the corresponding gap filler. The main control unit detects a name of the subway station where the gap filler is located or the name of the subway station located near the gap filler as location information corresponding to the GFID.

The sub control unit stores GFID storage field information in advance, and detects GFID by using the GFID storage field information. The main control unit outputs a control signal notifying a user of the digital multimedia broadcasting receiver who is in motion, when the location information corresponding to the GFID does not exist in the location information storing unit.

When the location information corresponding to the detected GFID does not exist in the location information storing unit, the main control unit determines an advance direction of a user of the digital multimedia broadcasting receiver, detects a nearby GFID of a gap filler located adjacent to a gap filler corresponding to the detected GFID toward an advance direction of the user, detects nearby gap filler location information corresponding to the nearby GFID, and detects nearby location information based on the nearby gap filler location information to transfer the detected nearby location information to the output unit.

In order to determine the advance direction of the user, the main control unit detects and stores a serial number corresponding to the detected GFID in the location information storing unit, compares the serial number corresponding to a current GFID with the serial number corresponding to an immediately previous GFID, and determines whether the advance direction is in a forward direction or a backward direction based on the comparison result.

According to the present invention, a method of notifying location information of a digital multimedia broadcasting (DMB) receiver is disclosed, wherein the DMB receiver stores location information of each gap filler matched to a gap filter identification (GFID), the gap filler relaying digital multimedia broadcasting data transmitted from a satellite, includes receiving digital multimedia broadcasting data from the gap filler; detecting the GFID of the gap filler from the received digital multimedia broadcasting data; detecting location information of the gap filler by using the GFID; and outputting the location information.

The detecting of the GFID is performed using a pre-stored GFID storage field information. Detecting of the location information includes detecting information on a subway station in which the gap filler is located or information on a subway station near a location of the gap filler by using the GFID.

Outputting of the location information includes outputting the information on the subway station in which the gap filler is located or the information on the subway station near a location the gap filler.

The method further includes providing a notification that a user of the digital multimedia broadcasting receiver is in motion, when the location information corresponding to the GFID does not exist.

The method also includes determining an advance direction of a user of the digital multimedia broadcasting receiver when the location information corresponding to the GFID does not exist, detecting a nearby GFID of a gap filler located adjacent to a gap filler corresponding to the detected GFID toward the advance direction of the user, detecting nearby gap filler location information corresponding to the nearby GFID, and outputting nearby location information by using the nearby gap filler location information.

Determining the advance direction includes detecting and storing a serial number corresponding to the detected GFID, comparing the serial number corresponding to a current GFID with the serial number corresponding to an immediately previous GFID, and determining the advance direction as a forward direction or a backward direction based on the comparison result.

BRIEF DESCRIPTION OF THE DRAWINGS

The above and other objects, features and advantages of the present invention will be more apparent from the following detailed description when taken in conjunction with the accompanying drawings, in which:

FIGS. 4A through FIG. 4C are schematic views illustrating an example of database structure for managing information required to notify a location of a digital multimedia broadcasting receiver according to an embodiment of the present invention;

DETAILED DESCRIPTION OF PREFERRED EMBODIMENTS

Hereinafter, preferred embodiments of the present invention will be described in detail with reference to the accompanying drawings. The same reference numbers will be used for the same or like components in the accompanying drawings. Additionally, detailed explanations for well-known functions and compositions will be omitted for the sake of clarity and conciseness.

Figure 1:
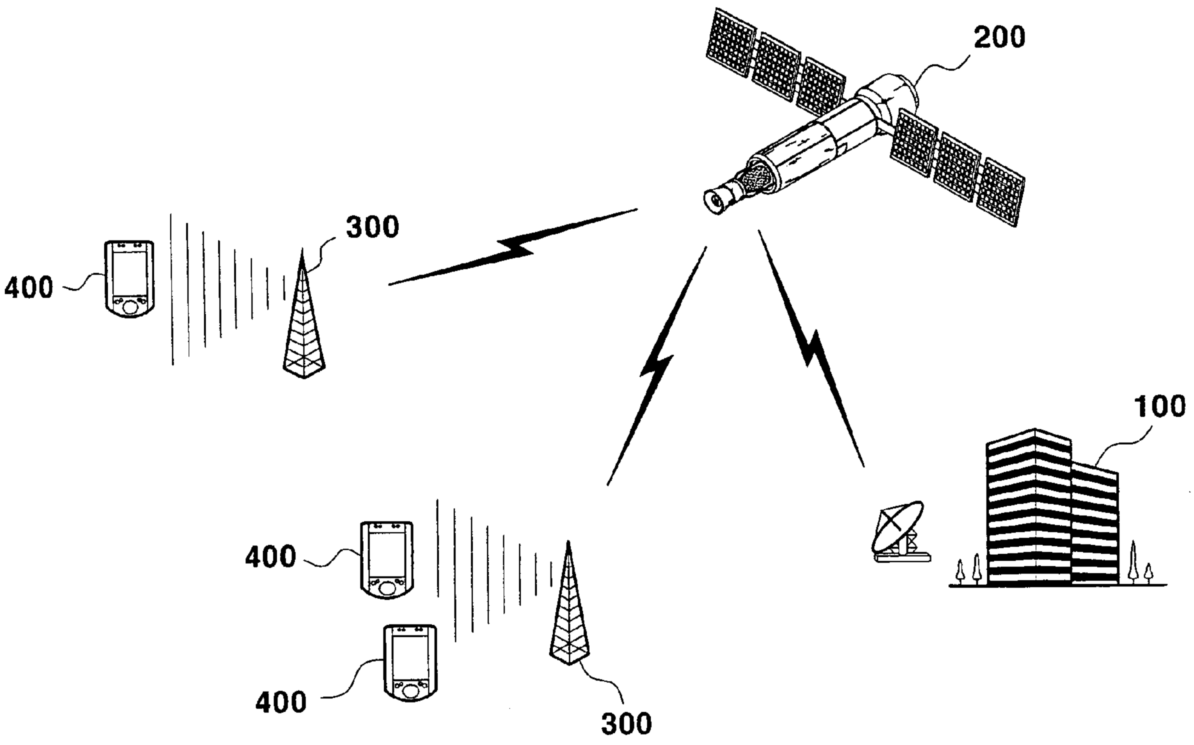
FIG. 1 is a schematic view illustrating a digital multimedia broadcasting system according to the present invention.

FIG. 1 is a schematic view illustrating a digital multimedia broadcasting (DMB) system according to the present invention.

In FIG. 1, the digital multimedia broadcasting system is a satellite DMB system. The satellite DMB system includes a broadcasting station 100, a digital broadcasting satellite 200, a gap filler 300 and a DMB receiver 400.

The broadcasting station 100 generates a variety of broadcasting signals having a frequency of approximately 14 GHz. For example, the broadcasting signals include a moving picture, a music video and a drama. The broadcasting signals are transmitted to the digital broadcasting satellite 200.

The digital broadcasting satellite 200 receives the broadcasting signals having a frequency of approximately 14 GHz from the broadcasting station 100 to transmit the broadcasting signals having a frequency of approximately 2.6 GHz or 14 GHz.

The gap filler 300 receives the broadcasting signal having a frequency of about 14 GHz from the digital broadcasting satellite 200 to output the broadcasting signal having a frequency of about 2.6 GHz.

The gap filler 300 inserts a GFID in a specific region of the broadcasting signal, for example, a pilot channel, received from the digital broadcasting satellite 200. Therefore, respective broadcasting signals outputted from the gap filler 300 include the gap filler identification GFID. The gap filler 300 has its own GFID, which is varied according to the gap filler 300.

The DMB receiver 400 receives a broadcasting signal having a frequency of about 2.6 GHz from the digital broadcasting satellite 200 or the gap filler 300. Particularly, the DMB receiver 400 performs a location information notification function by using GFID included in the broadcasting signal received from the gap filler 300. Herein, the DMB receiver 400 may be embodied as a mobile communication terminal such as a cellular phone or a personal digital assistant (PDA). A schematic configuration of the DMB receiver 400 is shown in FIG. 2.

Figure 2:
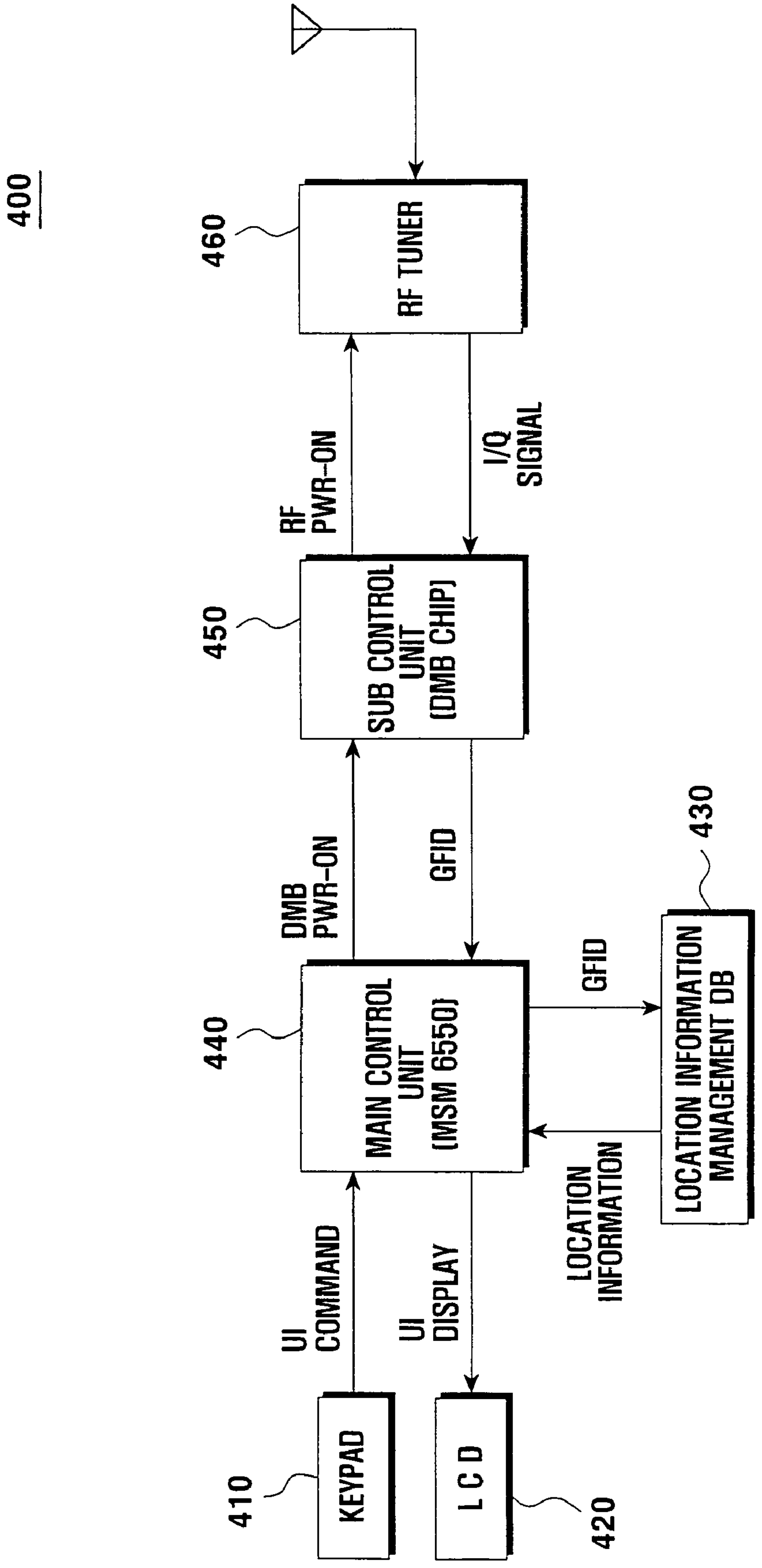
FIG. 2 is a block diagram illustrating a digital multimedia broadcasting receiver according to an embodiment of the present invention.

FIG. 2 is a block diagram illustrating a digital multimedia broadcasting receiver according to an embodiment of the present invention. Referring to FIG. 2, a DMB receiver 400 includes a keypad 410, a liquid crystal display (LCD) 420, a location information management database (DB) 430, a main control unit 440, a sub control unit 450, and an RF tuner 460.

The keypad 410 receives a manipulation signal (UI command) generated by a user for controlling the DMB receiver 400, and outputs the UI command to the main control unit 440.

The LCD 420 is used to display a variety of information related to the operation of the DMB receiver 400 under the control of the main control unit 440. Particularly, the LCD 420 displays a DMB data received through the RF tuner 460, under the control of a main control unit 440. In addition, the LCD 420 receives location information of the DMB receiver 400 from the main control unit 440, and displays the received location information. Herein, the method of displaying the received location information may be implemented in various ways. For example, the LCD 420 may display the received location information using map information or a subway route map. Thus, the display method of the LCD 420 is intended to include any such alternative method, and not to be dependent on any particular configuration.

The location information management DB 430 stores and manages information required to determine the location information of the DMB receiver 400. Particularly, it is desirable that the location information management DB 430, stores and manages the location information of each gap filler concerning where the gap filler is installed. For example, it is desirable that the location information management DB 430 stores the location information corresponding to respective gap fillers, such as the information of a subway station where the gap filler is located. Example configurations of database structure of the location information management DB 430 will be described later with reference to FIGS. 4A through 4C.

The main control unit 440 controls the operation of a mobile communication terminal having a DMB receiver 400. For example, the main control unit 440 uses user command (UI command) input through the keypad 410 or pre-stored control algorithm. Particularly, the main control unit 440 controls the power-on or power-off of the sub control unit 450 according to user request provided through the keypad 410. In addition, the main control unit 440 receives GFID from the sub control unit 450, detects location information corresponding to the GFID by searching a location information management DB 430 using the GFID, and outputs the detected information through the LCD 420. In one embodiment, the main control unit 440 may be embodied as a mobile station modem (MSM) 6550 chip.

The sub control unit 450, also called a DMB chip, starts to operate in response to a DMB power control signal transmitted from the main control unit 440 so that the RF tuner 460 is turned on to receive DMB data. Herein, the turn-on operation of the RF tuner 460 is performed based on an RF power control signal provided from the sub control unit 450 to the RF tuner 460. In addition, upon the receipt of an I/Q signal including DMB data, the sub control unit 450 extracts GFID from the received I/Q signal, and transmits the GFID to the main control unit 440. Particularly, the GFID detected by the sub control unit 450 from a pilot channel received through the RF tuner corresponds to the gap filler, which transmits the pilot channel to the sub control unit 450. In this circumstance, the main control unit 440, which receives the GFID from the sub control unit 450, may detect location information of the corresponding gap filler based on the received GFID. To perform the above procedure, the sub control unit 450 may store GFID field information of each pilot channel. Herein, the GFID field indicates a location where the GFID is stored.

The RF tuner 460 starts to operate in response to the RF tuner power control signal received from the sub control unit 450, to receive the DMB data and transmit the received DMB data to the sub control unit 450.

Figure 3:
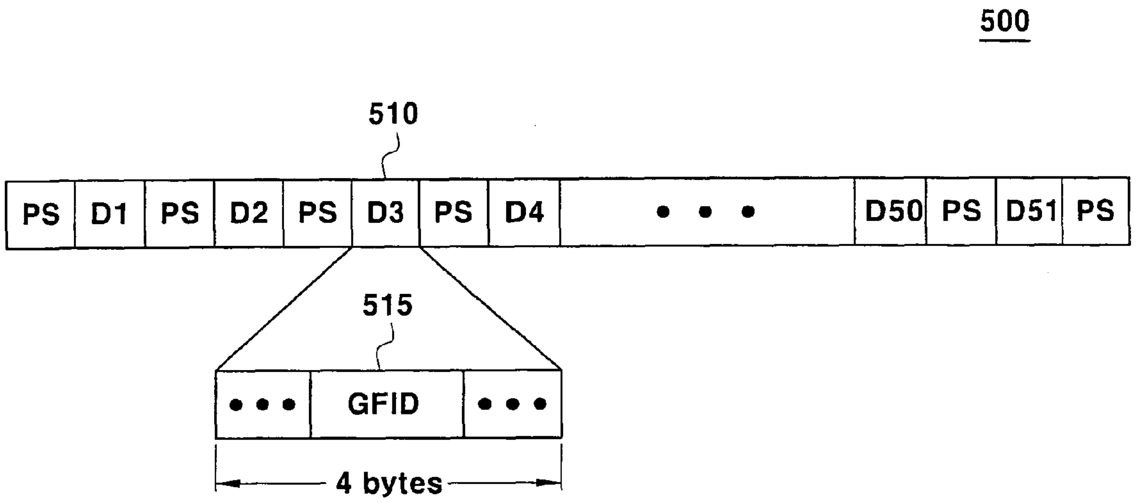
FIG. 3 is a schematic view illustrating an example of a data format of a digital multimedia broadcasting data received by a digital broadcasting receiver according to an embodiment of the present invention.

FIG. 3 is a schematic view illustrating an example of a data format of a digital multimedia broadcasting data received by a digital broadcasting receiver according to an embodiment of the present invention.

Particularly, FIG. 3 illustrates a frame of the DMB data 500. The data format of the DMB data 500 is configured such that a pilot symbol (PS) of 32 bits and a satellite broadcasting control data (D1 through D51) of 32 bits are alternately disposed. Herein, each binary bit value of the pilot symbol data is '1', D1 represents a unit word, D2 represents a frame counter, D3 through D50 represent control data for respective broadcasting channels, and D51 represents a reservation control data filed, which contains no data.

The DMB data 500 having a data format as shown in FIG. 3 includes various control information and channel information stored in the data fields as those described above (D1 through D51).

Accordingly, the gap filler stores GFID in a data field in which data are not stored among the data fields (D1 through D51), and transmits the GFID to the DMB receiver. In general, the gap filler stores GFID by using upper four bytes of D3 510 among the data fields of the DMB data 500 in FIG. 3. Alternatively, the gap filler may store GFID by using the data field D51 that contains no data.

Therefore, in order for the sub control unit 450 to detect GFID from the DMB data 500, information concerning the data field in which the GFID is stored in the DMB data 500 may be predefined so that the sub control unit 450 detects the GFID by searching the predefined data area.

FIGS. 4A through FIG. 4C are schematic views illustrating an example of database structure for managing information required to notify a location of a digital multimedia broadcasting receiver according to the present invention. Particularly, the database structures in FIGS. 4A through 4C are configured to store information on the subway station corresponding to each GFID.

In FIG. 4A, a first database includes flag information so as to represent whether a gap filler is located in a corresponding station or in the vicinity of the corresponding station, under the condition that each gap filler located in a particular station is matched to the name of the station, and the gap filler located in the vicinity of the station (e.g., between the station and the next station) is matched to either the name of the station or the name of the next station.

In FIG. 4B, a second database includes information representing whether a gap filler is located in a specific station or near the specific station. In a third database of FIG. 4C, a gap filler located in a specific station is matched to the name of the station, and a gap filler located between two stations is not matched to any station.

Referring to FIG. 4A, the first database includes a serial number field 431A, a subway station field 433A, a flag field 435A, and a GFID field 437A. Referring to FIG. 4A, a gap filler of which GFID is '5' is located in Station A, and matched to Station A. In addition, a gap filler of which GFID is '100' is located between Station A and a Station B, and matched to the Station A. A gap filler of which GFID is '120' is located in Station B, and matched to Station B. A gap filler of which GFID is '70' or '16' is located between the Station B and a Station C, and matched to the Station B. A gap filler of which GFID is '30' is located between the Station B and the Station C, and matched to the Station C. A gap filler of which GFID is '150' is located in the Station C, and matched to the Station C. A gap filler of which GFID is '210' is located between the Station C and a Samsung station (the next station, not marked in FIG. 4A), and matched to the Station C. In FIG. 4A, flag information 435A represents whether the gap filler is located in a station to which the gap filler is matched.

Referring to FIG. 4B, the second database includes a serial number field 431B, a subway station field 433B, and a GFID field 437B. Referring to FIG. 4B, a gap filler of which GFID is '5' is located in Station A, and matched to Station A. A gap filler of which GFID is '100' is located between Station A and Station B, and information representing the gap filler is near Station A is stored in the subway station field 433B as, for example, 'vicinity of Station A'. A gap filler of which GFID is '120' is located in the Station B, and matched to Station B. A gap filler of which GFID is '70' or '16' is located between Station B and Station C, and information representing the gap filler is near Station B is stored as 'vicinity of Station B'. A gap filler of which GFID is '30' is located between Station B and Station C, and information representing the gap filler is near the Station C and is stored as 'vicinity of Station C'. A gap filler of which GFID is '150' is located in Station C, and is matched to Station C. A gap filler of which GFID is '210' is located between Station C and the next Station (not marked in FIG. 4B), and information representing the gap filler is near Station C and is stored as 'vicinity of Station C'.

Referring to FIG. 4C, a third database includes a serial number field 431 C, a subway station field 433C, and a GFID field 437C. Referring to FIG. 4C, a gap filler of which GFID is '5' is located in Station A, and matched to Station A. A gap filler of which GFID is '120' is located in the Station B, and matched to the Station B. A gap filler of which GFID is '150' is located in the 'Seonleng' station, and matched to the 'Seonleng' station. It is shown in FIG. 4C that any one of a gap filter of which GFID is '100' located between the Station A and the Station B, a gap filter, of which GFID is '70', '16', or '30', located between the Station B and the Station C, and a gap filler of which GFID is '210' located between Station C and a next station (not marked in FIG. 4C), is not matched to any station.

A method of storing location information in the DMB receiver using the GFID is not limited by embodiments described in FIGS. 4A through 4C. For example, although the GFID is matched to the subway station name in the embodiments in FIG. 4A through 4C, the GFID may alternatively be matched to a street name or a bus station.

Figure 5:
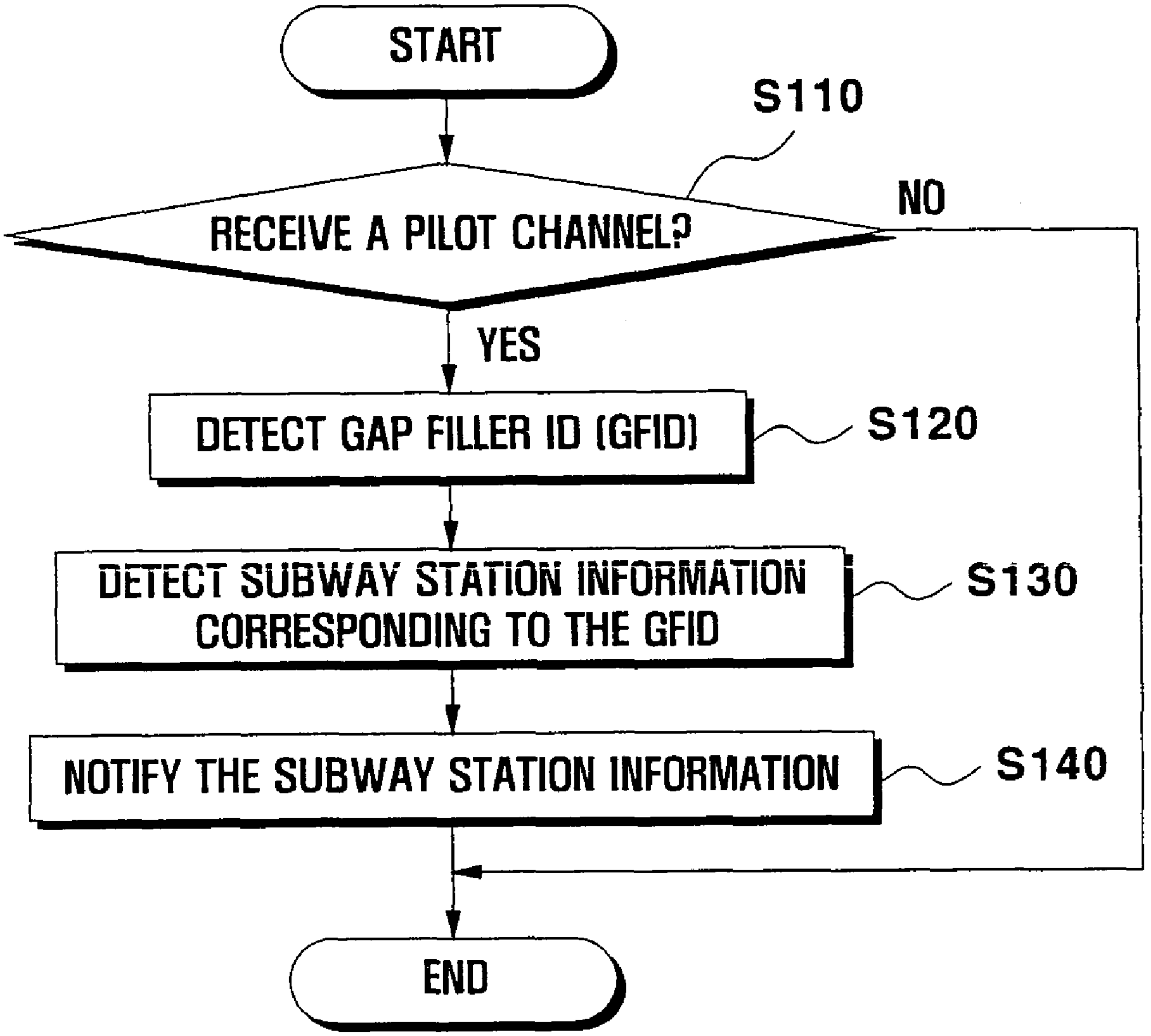
FIG. 5 is a flowchart diagram illustrating a method of notifying a location of a digital multimedia broadcasting receiver according to an embodiment of the present invention.

FIG. 5 is a flowchart diagram illustrating a method of notifying a location of a digital multimedia broadcasting receiver according to an embodiment of the present invention. Particularly, FIG. 5 is a flowchart diagram illustrating a method of notifying a location of the DMB receiver that stores location information as shown in FIG. 4A or FIG. 4B. Namely, the location information each of which is matched to corresponding location information (e.g., subway station name) is stored.

Referring to FIGS. 2 and 5, if DMB data including a pilot channel are received through the RF tuner 460 (step S110), the sub control unit 450 detects identification information (i.e., GFID) of a gap filler from which the pilot channel is transmitted by analyzing the DMB data (step S120). Herein, the sub control unit 450 transmits the detection result to the main control unit 440.

Accordingly, the main control unit 440 detects information on the subway station corresponding to the GFID by searching a location information management DB 430 using the GFID (step S130), and notifies a user of the detected information (step S140). For example, the main control unit 440 displays a current subway station name on the LCD 420 based on the detected information.

In this case, supplementary information of the location information management DB 430 may be used so as to check whether the information detected in step S130 represents an accurate location or nearby information, when the location information management DB 430 has a structure as illustrated in FIG. 4A and FIG. 4B.

For example, when the location information management DB 430 has a structure as illustrated in FIG. 4A, the main control unit 440 checks whether the information detected in step S130 represents an accurate location or nearby information by checking flag information corresponding to the GFID detected in step S120. That is, the main control unit 440 verifies that the subway station information detected in step S130 represents the accurate location when flag information is T, and verifies that the subway station information detected in step S130 represents nearby information when flag information is F.

In addition, when the location information management DB 430 has a structure as illustrated in FIG. 4B, the main control unit 440 checks whether the subway station information detected in step S130 represents an accurate location or nearby information by checking whether subway station field 433B stores a subway station or nearby information.

The subway station information is used to calculate time or distance from current location to a destination and time.

Figure 6:
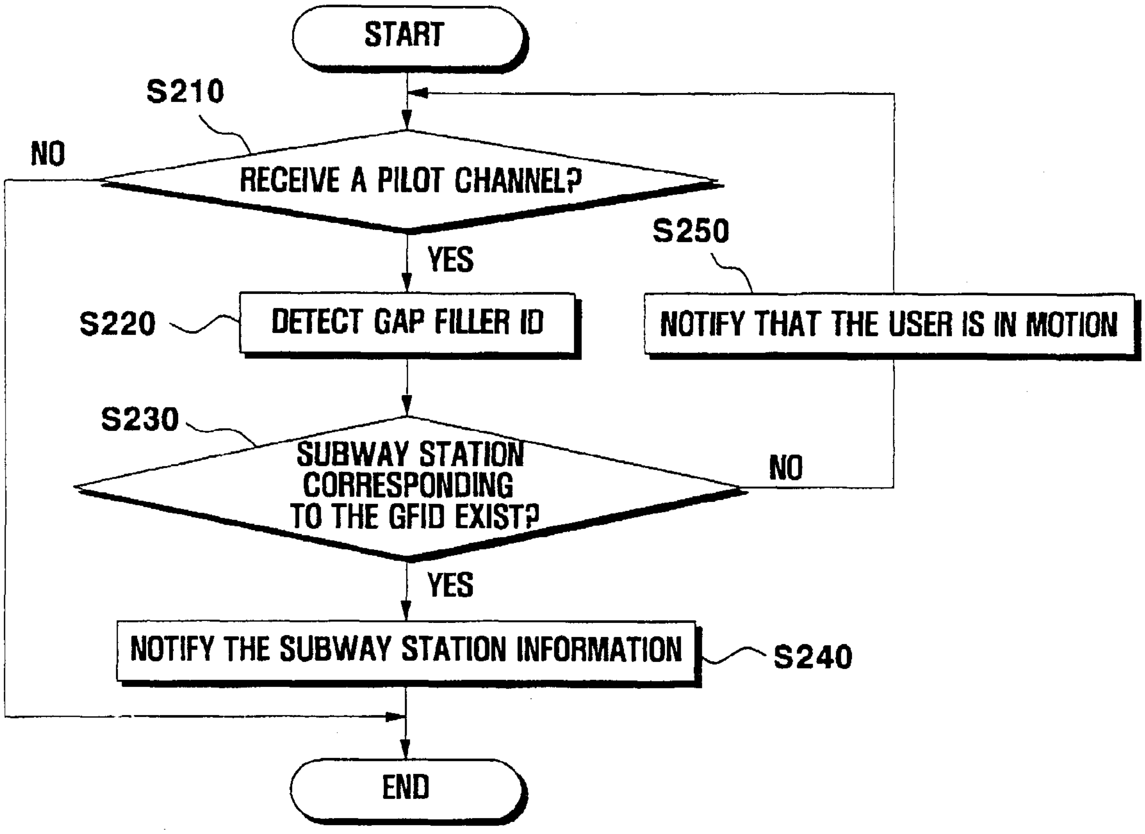
FIG. 6 is a flowchart diagram illustrating a method of notifying a location of a digital multimedia broadcasting receiver according to another embodiment of the present invention.

FIG. 6 is a flowchart diagram illustrating a method of notifying a location of a digital multimedia broadcasting receiver according to the present invention. In FIG. 6, the GFID is matched to a specific area such as a subway station, and if the GFID corresponds to no specific area, the GFID is not matched to any location information.

Referring to FIGS. 2 and 6, a method of notifying location of a DMB receiver according to the present invention is as follows. First, when DMB data including a pilot channel are received through the RF tuner 460 (step S210), the sub control unit 450 detects identification information (i.e., GFID) of a gap filler from which the pilot channel is transmitted, that is GFID, by analyzing the DMB data (step S220). Herein, the sub control unit 450 transfers the detection result to the main control unit 440.

Accordingly, the main control unit 440 determines whether subway station information corresponding to the GFID exists by searching the location information management DB 430 using the GFID (step S230), and notifies a user of the subway station information if it is determined that subway station information corresponding to the GFID exists in step S230 (step S240).

If it is determined that subway station information corresponding to the GFID does not exist in step 230, the main control unit 440 is preferred to notify a user that the user is in motion (step 250). This is because the location information management DB 430 matches only a gap filler located in a specific subway station to a name of the specific subway station. Consequently, it is likely that a user is in motion between certain subway stations when there exists no subway station corresponding to the received GFID.

Figure 7A:
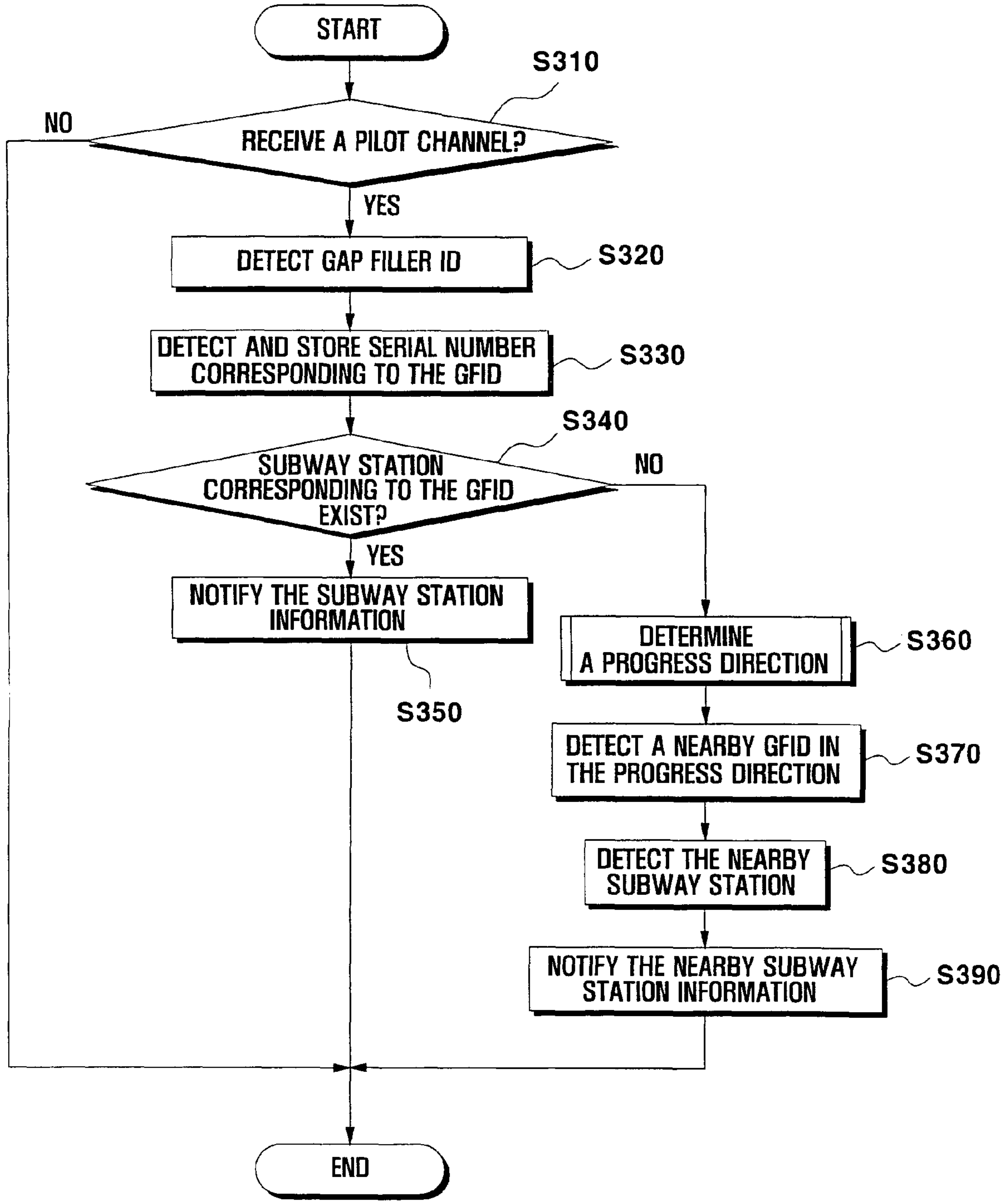
FIGS. 7A and 7B are flowchart diagrams illustrating a method of notifying a location of a digital multimedia broadcasting receiver according to still another embodiment of the present invention.
Figure 7B:
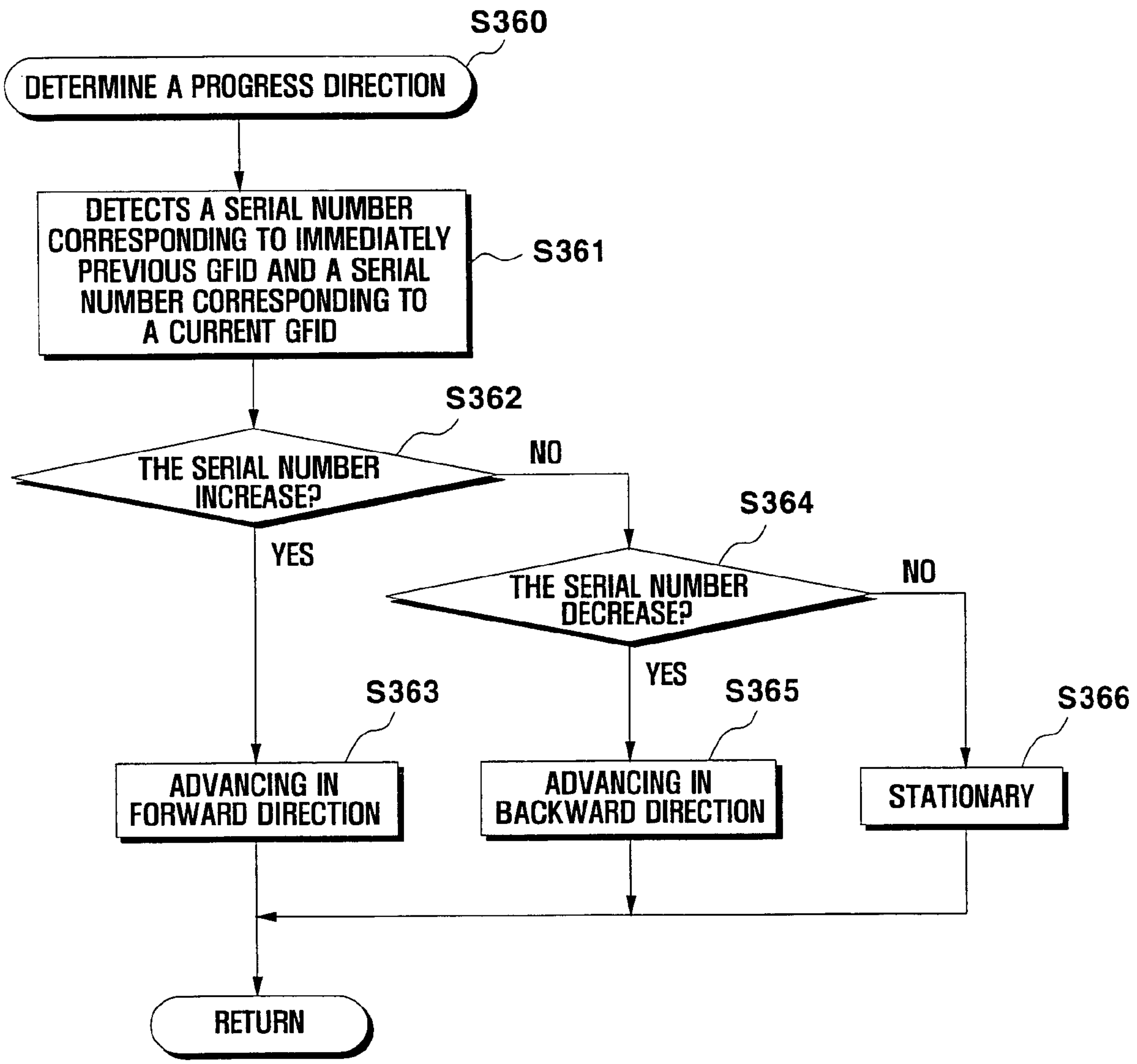

FIGS. 7A and 7B are flowchart diagrams illustrating a method of notifying a location of a digital multimedia broadcasting receiver according to the present invention. In FIGS. 7A and 7B, the GFID is matched to a specific area such as a subway station, and if the GFID corresponds to no specific area, the GFID is not matched to any location information.

A method of notifying location of a DMB receiver according to the present invention is described with reference to FIGS. 2 and 7A. First, if DMB data including a pilot channel is received through the RF tuner 460 (step S310), the sub control unit 450 detects identification information (i.e., GFID) of a gap filler from which the pilot channel is transmitted by analyzing the DMB data (step S320). The sub control unit 450 transmits the detection result to the main control unit 440.

Accordingly, the main control unit 440 detects a serial number corresponding to the GFID by accessing the location information management DB 430 using the GFID, and stores the detected serial number (step 330). Consequently, an advance direction of a user in motion can be known according to a variation of the serial number, when a subway station corresponding to the GFID does not exist. Herein, at least a current GFID and immediately previous GFID are stored in step 330.

Accordingly, the main control unit 440 storing the serial number corresponding to the GFID determines whether subway station information corresponding to the GFID exists by accessing the location information management DB 430 using the GFID (step S340), and notifies a user of the subway station information if it is determined that subway station information corresponding to the GFID exists in step 340 (step S350).

If it is determined that subway station information corresponding to the GFID does not exist in step 340, the main control unit 440 detects a nearby subway station toward the advance direction of a user, and notifies the user of information on the detected nearby subway station. To this end, the main control unit 440 determines an advance direction of a user (step S360), and detects a nearby GFID corresponding to a nearby subway station in the advance direction from the location information management DB 430 (step S370). In addition, the main control unit 440 detects information on a nearby subway station that is corresponding to the detected GFID (step S380), and notifies the user of information on the nearby subway station according to the detection result (step S390).

FIG. 7B is a flowchart diagram illustrating an operation of determining the advance direction in step S360 of FIG. 7A. Referring to FIGS. 2 and 7B, the main control unit 440 detects a serial number corresponding to immediately previous GFID and a serial number corresponding to a current GFID that are stored in step 330 from the location information management DB 430, and compares values of the detected serial numbers, in order to determine the advance direction of a user (step S361). The main control unit 440 determines the advance direction of the user based on the comparison result.

For example, if it is determined in step S361 that a serial number corresponding to the current GFID is greater than a serial number corresponding to the immediately previous GFID, namely, if the serial number increases (step S362), the main control unit 440 verifies that a user is moving in a forward direction (step S363). Similarly, if it is determined in step S361 that a serial number corresponding to the current GFID is less than a serial number corresponding to the immediately previous GFID, namely, if the serial number decreases (step S364), the main control unit 440 verifies that a user is moving in a backward direction (step S365). Meanwhile, if a serial number corresponding to the current GFID is equal to a serial number corresponding to the immediately previous GFID, the main control unit 440 verifies that a user is stationary (step S366).

Although it is described above that the GFID is matched to a subway station name, any method such that the GFID is matched to particular location information and notification of location information using the GFID is to be included within the scope of the present invention. For example, the GFID may be matched to specific location information such as a street name or a bus station name in various embodiments.

As mentioned above, the present invention may prevent a user who is viewing a DMB in a moving vehicle from missing his or her destination by providing a DMB receiver that performs a function of notifying location information using GFID and a method therefor. Accordingly, a user in motion may watch DMB with a decreased risk of missing a destination.

In addition, a user of a mobile communication terminal adopting a DMB receiving apparatus according to the present invention may recognize his or her current location without a separate global position system (GPS) receiving apparatus. Namely, a user may utilize both a DMB and a GPS function with a mobile communication terminal that does not include an expensive GPS receiving apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A digital multimedia broadcasting (DMB) receiver, the receiver comprising:

a location information storing unit for storing location information of gap fillers, which relay digital multimedia broadcasting data transmitted from a satellite;

a receiving unit for receiving digital multimedia broadcasting data including a gap filler identification (GFID);

a sub control unit for detecting the GFID from the received digital multimedia broadcasting data;

a main control unit for receiving the detected GFID from the sub control unit, searching the location information storing unit by using the GFID, and detecting location information corresponding to the detected GFID; and an output unit providing the location information.

2. The DMB receiver of claim 1, wherein the location information storing unit stores specific local information matched to the GFID.

3. The DMB receiver of claim 2, wherein the location information storing unit stores a subway station name matched to the GFID.

4. The DMB receiver of claim 3, wherein the location information storing unit matches the GFID of a receiver located between a first subway station and a second subway station to either the first or the second subway station name, and stores information indicating that the matched subway station name is a nearby subway station name.

5. The DMB receiver of claim 4, wherein the location information storing unit includes a flag representing whether a subway station name matched to the GFID is a subway station where a corresponding gap filler is located or a subway station located near the corresponding gap filler.

6. The DMB receiver of claim 5, wherein the main control unit detects a name of the subway station where the gap filler is located or the name of the subway station located near the gap filler as location information corresponding to the GFID.

7. The DMB receiver of claim 1, wherein the sub control unit stores GFID storage field information in advance, and detects GFID by using the GFID storage field information.

8. The DMB receiver of claim 1, wherein the main control unit outputs a control signal which notifies that a user of the digital multimedia broadcasting receiver is in motion to the output unit, when the location information corresponding to the GFID does not exist in the location information storing unit.

9. The DMB receiver of claim 1, wherein when the location information corresponding to the detected GFID does not exist in the location information storing unit, the main control unit determines an advance direction of a user of the digital multimedia broadcasting receiver, detects a nearby GFID of a gap filler located adjacent to a gap filler corresponding to the detected GFID toward an advance direction of the user, detects nearby gap filler location information corresponding to the nearby GFID, and detects nearby location information based on the nearby gap filler location information to transfer the detected nearby location information to the output unit.

10. The DMB receiver of claim 9, wherein, in order to determine the advance direction of the user, the main control unit detects and stores a serial number corresponding to the detected GFID in the location information storing unit, compares the serial number corresponding to a current GFID with the serial number corresponding to an immediately previous GFID, and determines whether the advance direction is in a forward direction or a backward direction based on the comparison result.

11. The DMB receiver of claim 1, wherein the output unit is a liquid crystal display (LCD).

12. The DMB receiver of claim 1, wherein the receiver is one of a mobile phone and a personal digital assistant (PDA).

13. A method of notifying location information of a digital multimedia broadcasting (DMB) receiver, wherein the DMB receiver stores location information of each gap filler matched to a gap filter identification (GFID), the gap filler relaying digital multimedia broadcasting data transmitted from a satellite, the method comprising:

receiving digital multimedia broadcasting data from the gap filler;

detecting, by a sub control unit, the GFID of the gap filler from the received digital multimedia broadcasting data;

receiving, by a main control unit, the detected GFID from the sub control unit, searching a location information storing unit by using the GFID, and detecting location information of the gap filler by using the GFID; and outputting the location information.

14. The method of claim 13, wherein the detecting of the GFID is performed using a pre-stored GFID storage field information.

15. The method of claim 13, wherein the detecting of the location information includes detecting information on a subway station in which the gap filler is located or information on a subway station near a location of the gap filler by using the GFID.

16. The method of claim 15, wherein the outputting of the location information includes outputting the information on the subway station in which the gap filler is located or the information on the subway station near a location of the gap filler.

17. The method of claim 13, further comprising providing a notification that a user of the digital multimedia broadcasting receiver is in motion, when the location information corresponding to the GFID does not exist.

18. The method of claim 13, further comprising:

determining an advance direction of a user of the digital multimedia broadcasting receiver when the location information corresponding to the GFID does not exist;

detecting a nearby GFID of a gap filler located adjacent to a gap filler corresponding to the detected GFID toward the advance direction of the user;

detecting nearby gap filler location information corresponding to the nearby GFID; and outputting nearby location information by using the nearby gap filler location information.

19. The method of claim 18, wherein the determining of the advance direction includes:

detecting and storing a serial number corresponding to the detected GFID;

comparing the serial number corresponding to a current GFID with the serial number corresponding to an immediately previous GFID; and determining the advance direction as a forward direction or a backward direction based on the comparison result.

* * * * *